United States Patent [19]
Takata et al.

[11] Patent Number: 6,036,360
[45] Date of Patent: Mar. 14, 2000

[54] TEMPERATURE MEASURING APPARATUS FOR PRINT CARD AND AIR VELOCITY MEASURING APPARATUS

[75] Inventors: Junji Takata; Shinichi Saikawa, both of Tokyo, Japan

[73] Assignee: Mitsubishi Denki Kabushiki Kaisha, Tokyo, Japan

[21] Appl. No.: 09/009,259

[22] Filed: Jan. 20, 1998

[30] Foreign Application Priority Data

Jan. 27, 1997 [JP] Japan ..................................... 9-012370

[51] Int. Cl.⁷ .............................. G01K 3/06; H05K 13/00
[52] U.S. Cl. ........................... 374/124; 374/131; 374/142
[58] Field of Search ................... 374/124, 131, 374/142

[56] References Cited

U.S. PATENT DOCUMENTS

| | | | |
|---|---|---|---|
| 3,463,007 | 8/1969 | Jones et al. ............................. | 374/124 |
| 3,798,366 | 3/1974 | Hunt et al. ............................. | 374/131 |
| 3,886,362 | 5/1975 | Miroshnikov et al. ................. | 374/142 |
| 4,607,963 | 8/1986 | Ulrickson ............................... | 374/131 |
| 5,210,680 | 5/1993 | Scheibler ............................... | 361/384 |
| 5,808,303 | 9/1998 | Schlagheck et al. ................... | 374/124 |

FOREIGN PATENT DOCUMENTS

| | | |
|---|---|---|
| 50-104977 | 8/1975 | Japan . |
| 4223237 | 8/1992 | Japan . |
| 2168811 | 6/1986 | United Kingdom . |
| WO9221147 | 11/1992 | WIPO . |

*Primary Examiner*—Randy W. Gibson
*Attorney, Agent, or Firm*—Leydig, Voit & Mayer, Ltd.

[57] ABSTRACT

A mirror is moved in parallel to a print card to reflect the infrared radiated from the print card. The reflected infrared is detected by a detector such as an infrared camera though a wind rectifying plate which can permeate the infrared but interrupts the air stream between the inside and outside of a card rack. The signal corresponding to the detected infrared is processed by a personal computer to measure the temperature distribution.

13 Claims, 13 Drawing Sheets

TEMPERATURE MEASURING APPARATUS FOR PRINT CARD AND AIR VELOCITY MEASURING APPARATUS

BACKGROUND OF THE INVENTION

The present invention relates to an apparatus for measuring the temperature distribution or air velocity distribution of a print card equipped with a circuit component on a printed board in a state where it is mounted in a card rack.

The temperature of a component used for an electric appliance greatly affects the performance and reliability of the device.

As the temperature of the component increases, in most cases, the timing condition of a signal becomes strict, thereby attenuating the reliability of the component (the reliability lowers ½ for a temperature increase of 10° C.).

Therefore, in order to attain the normal operation of a device and its reliability, a cooling apparatus and mounting apparatus must be adopted which can place all the components in a prescribed permissible temperature or lower (called "thermal design"). The measurement of temperature distribution of the print card in its state mounted in a sub-rack is an important test for verifying the thermal design.

In order to grasp the influence for temperature when the cooling fan suffers breakdown or a box structure has been changed partially, a technique for measuring the temperature distribution of the printed board in its mounted state in a real time is required.

FIG. 16 is a perspective view showing a technique for measuring the temperature distribution of a print card, as disclosed in e.g. the Unexamined Japanese Patent Application Publication No. Sho 50-104977.

In FIG. 16, reference numerals 1, 3, 4 and 5 denote a printed board equipped with circuit components, respectively. The intervals between the adjacent printed boards are set for the values when they are actually arranged on sub-racks. Reference numeral 6 denotes a plate of silicon (Si) or germanium (Ge) through which infrared can permeate. The interval between the plate 6 and printed board 1 is equally set for that between the printed board 1 and the other printed board which is to be arranged in front of it.

In front of the wafer 6, a thermal radiator video device such as a thermography device is arranged which can acquire the temperature distribution image of an object by detecting the infrared incident from the object.

An explanation will be given of the operation.

When power is supplied to the respective printed boards 1, 3, 4 and 5, the temperature of a print card of each printed board equipped with circuit components rises and becomes a stationary state after a predetermined time. As a result, the print card radiates infrared according to the temperature distribution of each print card.

After the infrared radiated from the circuit components of the printed board of such infrareds have permeated through the plate 6, they are detected by the thermal radiator video device 2. Therefore, the thermal radiator video device 2 can obtain the temperature distribution image of the print card of the printed board equipped with circuit components.

Generally, a plurality of sub-racks (card racks) equipped with a large number of print cards are stacked on a board of an electric appliance. Devices such as a power source and hard disk device and fan unit for cooling are also mounted on the board.

For the above electronic appliance, the method for measuring the temperature distribution of the above conventional print card has the following problems.

Basically, those other than the print cards at the ends provide a great error in the thermal environment. Where a plurality of sub-racks are arranged vertically, the thermal effect of the upper and lower sub-racks and for ventilation are not taken in consideration so that the state in which the print cards are actually mounted cannot be reflected.

The temperature distribution of the print cards at the ends in a mounted state can be measured in such a manner that a thin plate capable of permeating infrared is attached on a hole made in the board and side plate. Such a board and sub-rack with a hole are required for measuring the temperature.

SUMMARY OF THE INVENTION

The present invention has been accomplished in order to attain the above object, and intends to measure the temperature distribution of the print cards mounted in an actual box and sub-racks (card racks) reliably, and the air velocity of a cooling air stream having a great effect on the temperature.

(1) The temperature measuring apparatus for a print card according to the present invention comprises:
   a mirror unit having a mirror for reflecting an infrared radiated from a print card inserted in a card rack and equipped with a circuit component in a direction of inserting the print card, and a driver for making the mirror in the card rack movable in a direction of inserting/removing the print card or in another direction in parallel to the print card, the mirror unit being arranged in the proximity of the print card;
   infrared detecting means for detecting the infrared from the print card reflected by the mirror by moving the mirror using the driver; and
   measuring means for measuring the temperature distribution of the print card on the basis of a signal of the detected infrared.

(2) The temperature measuring apparatus for a print card also comprises:
   a mirror unit having a mirror for reflecting an infrared radiated from a print card inserted in a card rack and equipped with a circuit component in a direction of inserting the print card, a driver for making the mirror in the card rack movable in a direction of inserting/removing the print card or in another direction in parallel to the print card, and an interrupting member for permeating the reflected infrared and interrupting an air stream between the inside and outside the card rack, the mirror unit being arranged in the proximity of the print card; infrared detecting means for detecting the infrared from the print card reflected from the mirror moved by the driver and permeated through the interrupting member; and measuring means for measuring the temperature distribution of the print card on the basis of a signal of the detected infrared.

(3) In the above (1) or (2), the mirror unit is provided with a second mirror for reflecting the infrared reflected from the mirror or permeated through the interrupting member in a direction in which a plurality of print cards are arranged from the front of the card rack, and the infrared detecting means is arranged at a position outside the card rack where the infrared reflected from the second mirror are detected.

(4) In the above (1) or (2), an infrared sensor for detecting the infrared reflected from the mirror is provided in the vicinity of the boundary between the inside and outside of the card rack, or its outside in front of the card rack, or the infrared sensor is provided in place of the interrupting member, the infrared from the print card obtained by moving the mirror using the driver is detected by the infrared sensor and measured by the measuring means.

(5) In the above (1) or (2), an infrared sensor for directly detecting the infrared is provided in place of the mirror for reflecting the infrared radiated from the print card, and the infrared from the print card detected by moving the infrared sensor by the driver is measured by the measuring means.

(6) The temperature measuring apparatus for a print card according to the present invention also comprises:

a detecting unit having an optical fiber for detecting an infrared radiated from a print card inserted in a card rack and equipped with a circuit component, and a driver for making the optical fiber in the card rack movable in parallel to the print card, the detecting unit being arranged in the proximity of the print card; infrared detecting means for detecting the infrared from the print card by moving the optical fiber using the driver; and measuring means for measuring the temperature distribution of the print card on the basis of a signal of the detected infrared.

(7) In any one of the above (1) to (6), where the mirror unit or detecting unit has covers on its upper and lower surface, at least one of the upper and lower covers is provided with an opening for cooling/ventilation whose area is adjustable.

In any one of the above (1) to (8), a panel heater is provided within the mirror unit or detecting unit or in the neighborhood of these units and in parallel to the print card.

(9) In any one of the above (1) to (8), the mirror unit or detecting unit has a size not larger than that occupied by a single print card and insertable in the card rack.

(10) In an air stream measuring apparatus using a temperature measuring apparatus for a print card defined in the above (1) or (2), and comprising in place of the infrared detecting means and the temperature measuring means, a visual image detecting means such as a video camera sensitive to visible light and a reproducing device therefor, or measuring means for measuring the air stream such as a laser current meter, a material for visualizing an air stream such as smoke in the card rack is passed through the card rack to acquire a visualized image of the air stream by the visual image detecting means and the reproducing device or the distribution of the air velocity by the measuring means.

Figure 1:
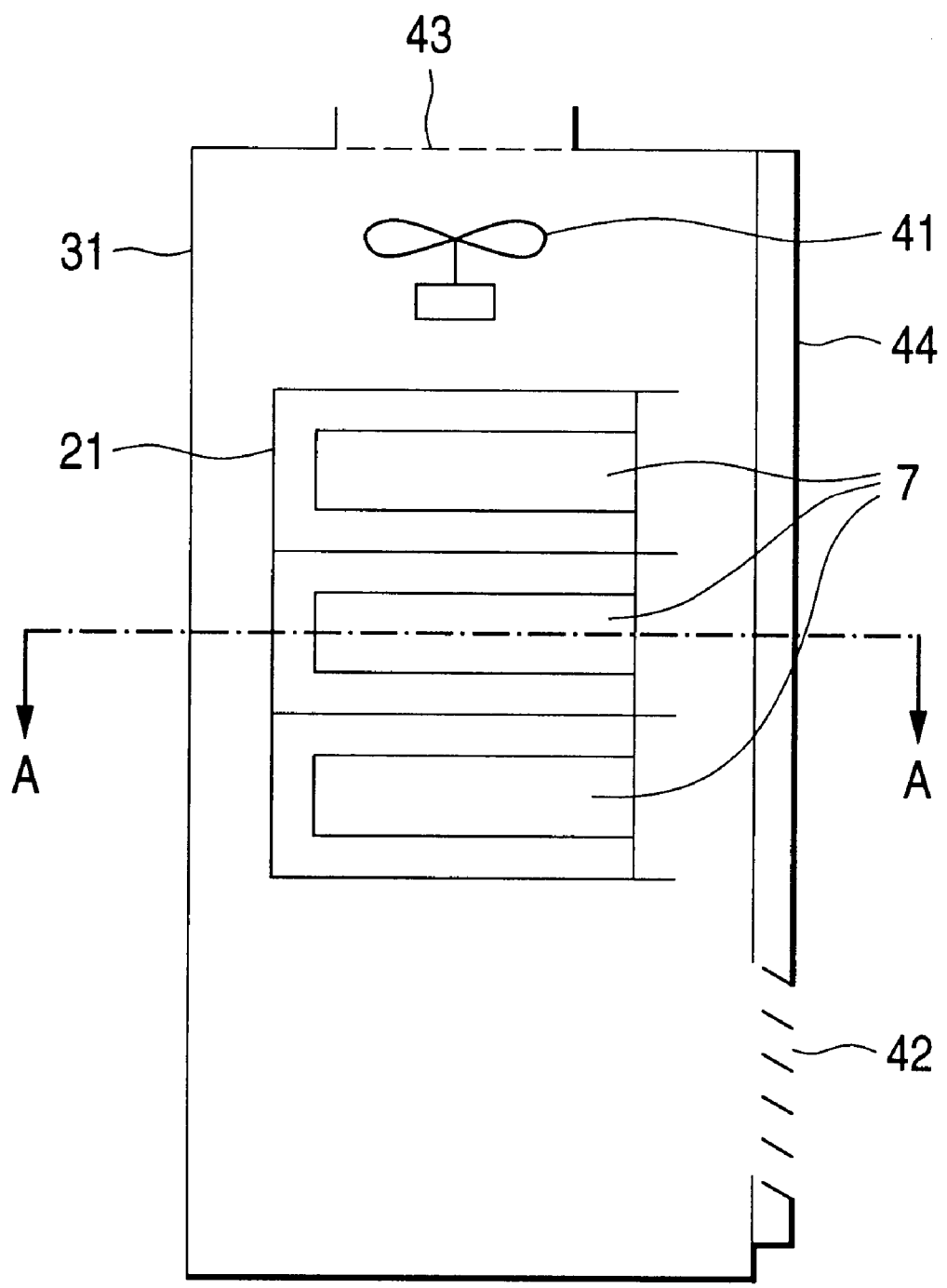
FIG. 1 is a view showing the arrangement of a board housing electric components which are an object of a temperature measuring device for a print card according to the first embodiment of the present invention.

DETAILED DESCRIPTION OF THE PREFERRED EMBODIMENTS (Embodiment 1)

Now referring to the drawings, an explanation will be given of the first embodiment of the present invention.

FIG. 1 shows an arrangement of the board of an electronic device.

In FIG. 1, reference numeral 7 denotes one of print cards each equipped with circuit components, 21 a sub-rack (card rack) for inserting/housing the print cards, 41 a fan, 42 an air intake inlet attached to the lower part of a door 44 of the board 31, and 43 an air exhaust outlet attached to the ceiling of the board 31.

The wind for cooling is driven by the fan 41, enters the board 31 from the intake inlet 42 and is exhausted from the exhaust outlet 43 through the sub-rack 21.

Figure 2:
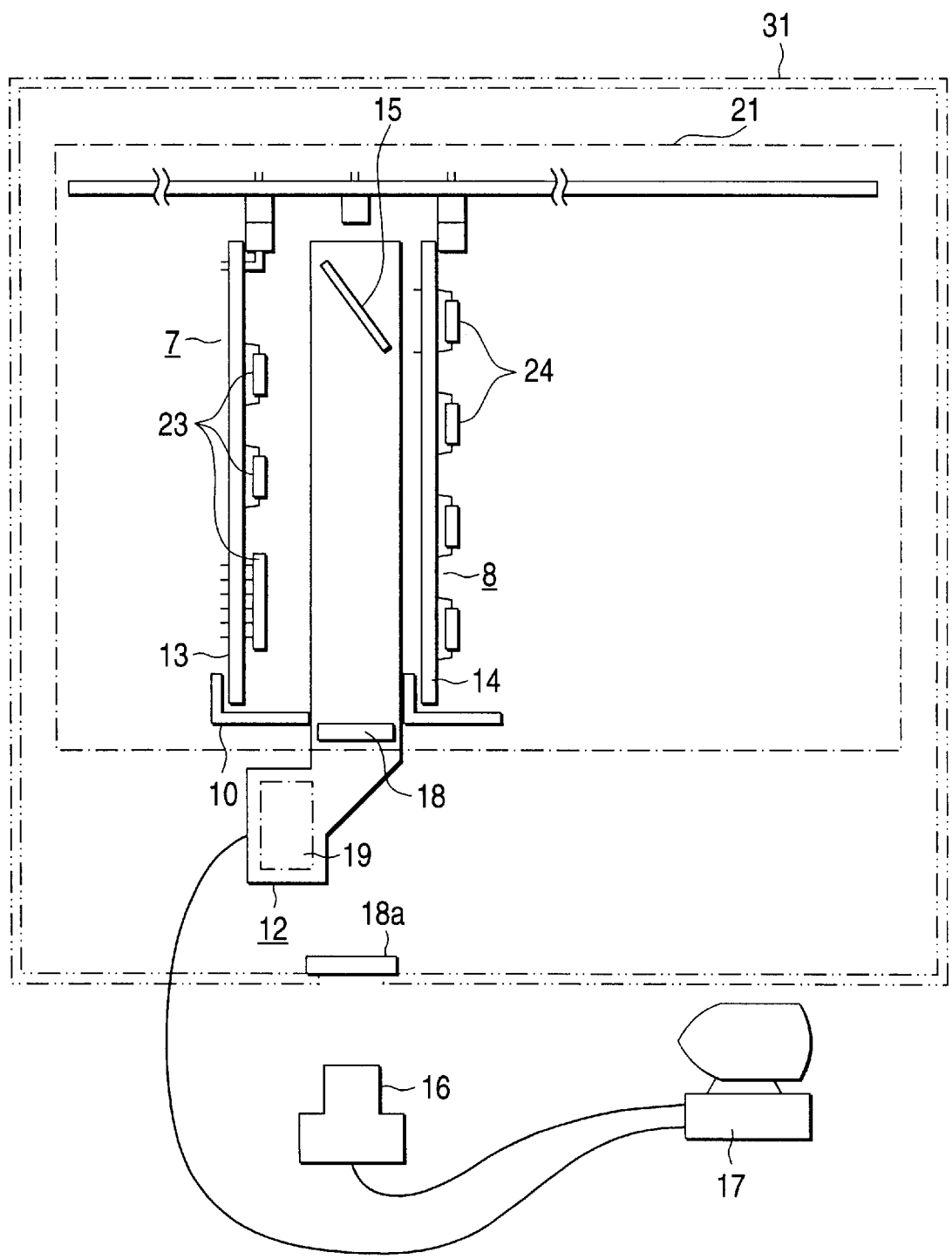
FIG. 2 is a view showing the configuration of the temperature measuring device for a print card according to the first embodiment.

FIG. 2 shows a section of line A—A of FIG. 1 when the sub-rack with the print cards installed is viewed from above.

Figure 3:
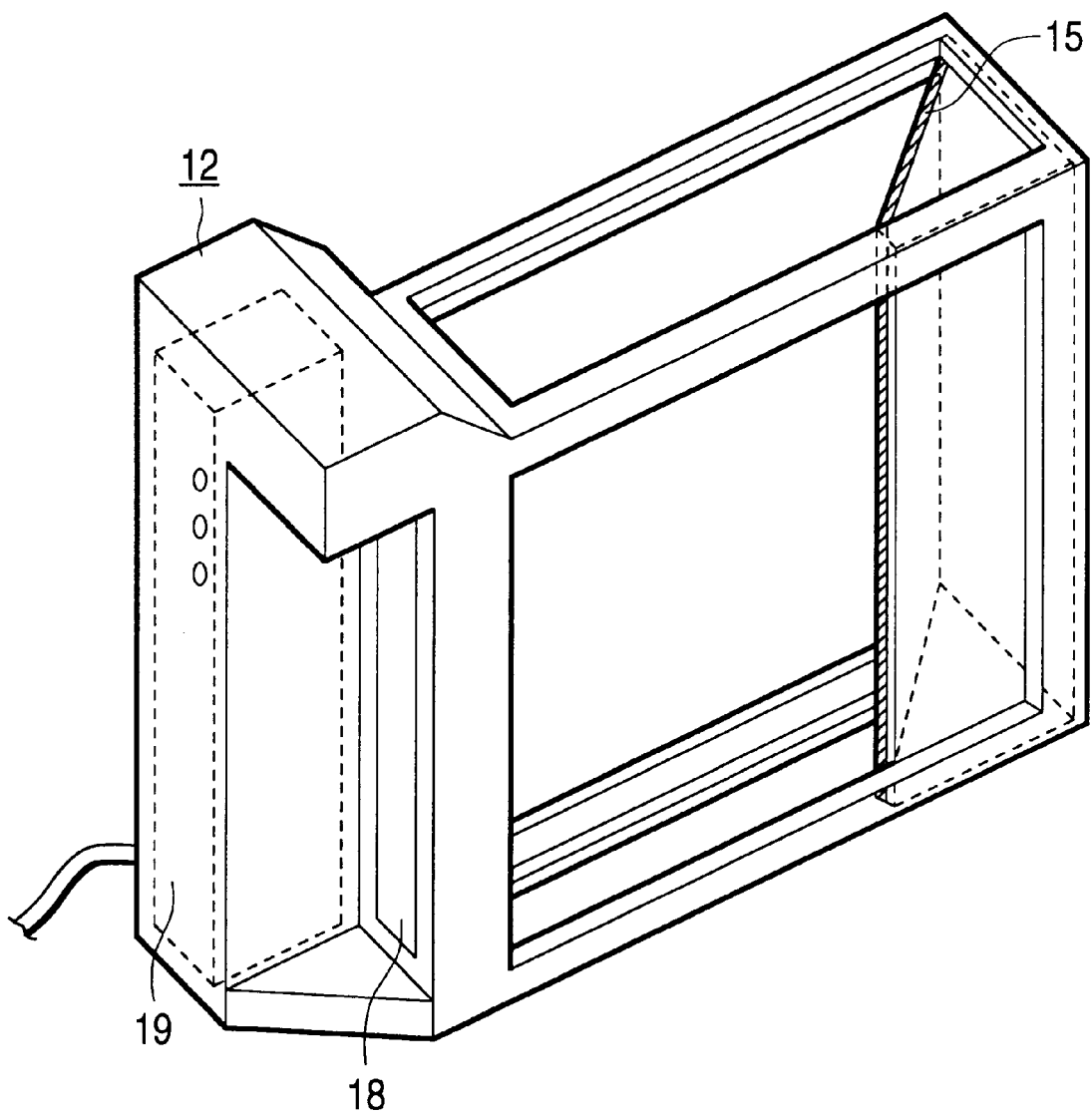
FIG. 3 is a perspective view of the mirror unit according to the first embodiment.

FIG. 3 is a perspective view of a mirror unit.

In FIGS. 2 and 3, reference numeral 7, 8 denote a print card, in which circuit components 23 and 24 are mounted on a printed board 13, 14. The print card is equipped with a front panel 10.

Reference numeral 12 denotes a mirror unit as shown in the perspective view of FIG. 3, 15 a mirror installed in the mirror unit 12 and having an angle of 45° formed with the printed board which is a measurement object. This mirror is manufactured by vapor-depositing aluminum on a glass substrate for example.

Reference numeral 18 denotes a wind rectifying plate for preventing wind leakage made of an infrared permeable material such as germanium. When an outside air stream (wind) is mixed into the air stream (wind) within the sub-rack 21, or the inside air stream leaks out, the cooling effect on the print card by the air stream within the sub-rack 21 does not represent an actual state. The wind rectifying plate 18 serves as an interrupting member for interrupting the air stream between the inside and outside of the sub-rack 21.

Reference numeral 18a denotes a wind rectifying plate for preventing wind leakage though which the infrared can permeate, like 18. This wind rectifying plate 18a serves as an interrupting member for interrupting the air stream (wind) between the inside and outside of the board.

Reference numeral 19 denotes a driver such as a motor or control circuit for driving the mirror. Reference numeral 16 denotes an infrared detector (infrared camera) such as a "thermopure". Reference numeral 17 denotes a personal computer which is connected to the infrared detector 16 and mirror unit 12, and serves as a measuring device for taking in the infrared image from the infrared detecting device in synchronism with an image detecting signal (signal corresponding to the moving position of the mirror) transmitted from the mirror unit 12 and processing the detected infrared image to provide a temperature distribution.

An explanation will be given of the operation.

The infrared radiated from the area of the printed board 13 projected onto the mirror 15 is reflected from the mirror 15.

Since the mirror 15 forms an angle of 45° with the printed board 13, the reflected infrared advances in the space between the printed boards in parallel to them, pass the wind rectifying plate 18 of the infrared permeating material and are detected by the infrared detector 16 installed in front of the sub-rack 21.

The infrared image of a portion of the print card 7 projected onto the mirror 15 is stored in a storage device within the infrared detector 16 or that within the personal computer 17.

In synchronism with storage of the image data, the mirror 15 is moved in parallel to the print card 7 by the driving mechanism 19 to measure the infrared image of another portion on the print card 7, adjacent to the portion with the infrared image already recorded, in a like manner.

Figure 4A:
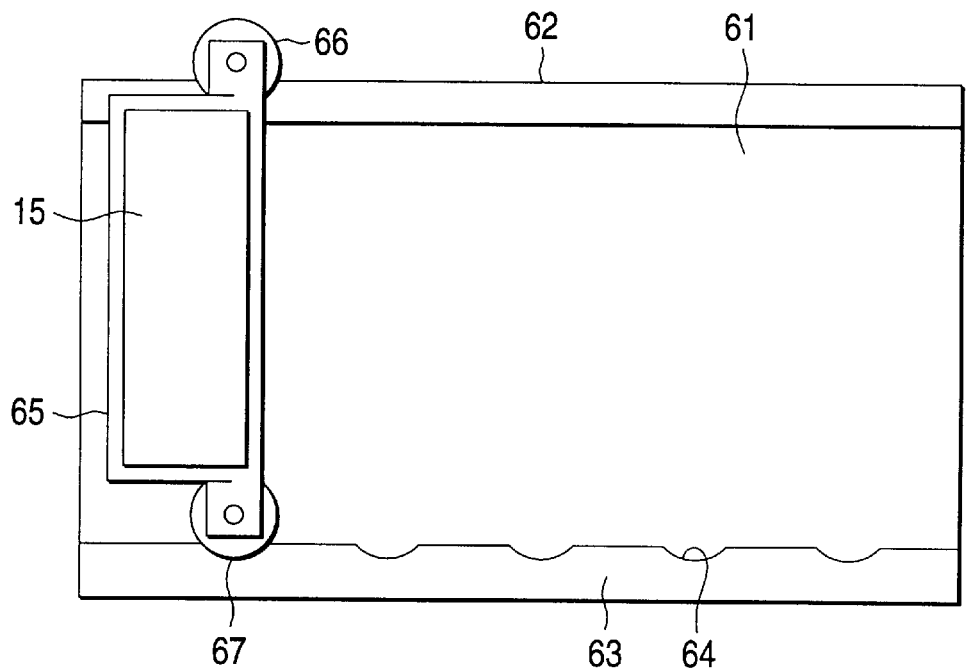
FIGS. 4A and 4B are arrangement view showing the main part of an exemplary mirror unit according to the first embodiment.
Figure 4B:
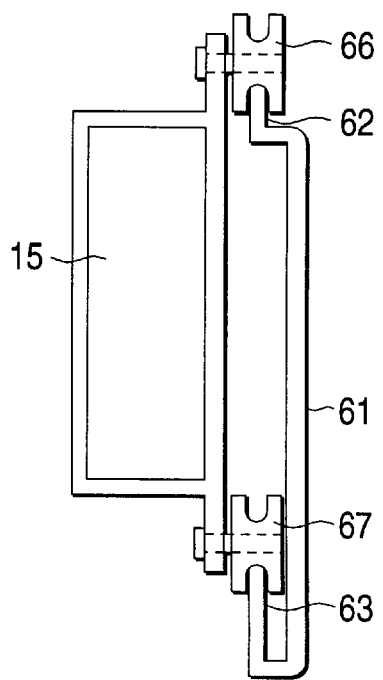

FIGS. 4A and 4B are view showing the main part of one example of the mirror unit 12; FIG. 4A is a side view and FIG. 4B is a front view.

In FIG. 4, reference numeral 61 denotes a side plate having an upper rail 62 and lower rail 63. The lower rail 63 includes positioning concave areas 64 in which a pulley is fit.

Reference numeral 65 denotes a movable plate which holds the mirror 15 and make it movable by pulleys 66 and 67. The movable plate 65 is moved by the driving device 19 as shown in FIGS. 2 and 3.

Figure 5:
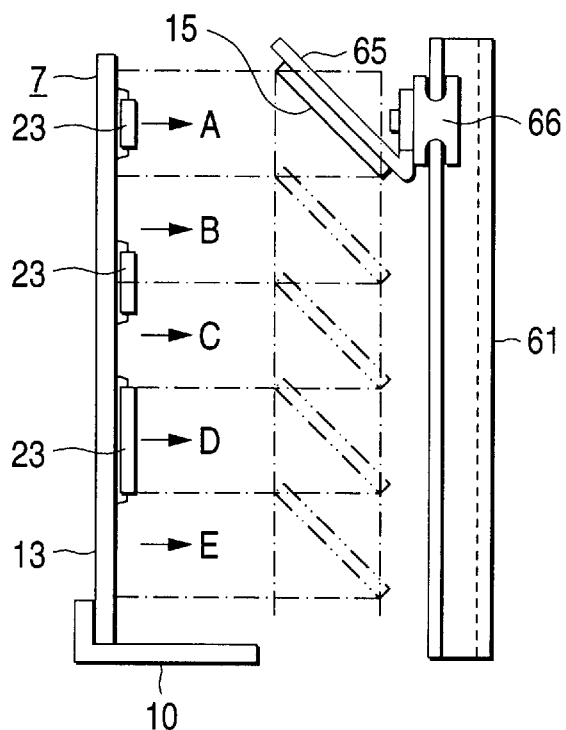
FIG. 5 is an arrangement view showing the arrangement of the mirror unit and print card in FIG. 4.

FIG. 5 shows the mirror unit installed adjacently to the print card to measure the temperature. When the pulleys as shown in FIG. 4 are located on each of concave portions, the mirror 15 captures the infrared images at positions A, B, C, D and E.

As shown in FIG. 4, the mirror 15 is continuously moved from the one end within the sub-rack 21. Thus, the strip-like infrared images resulting from division of the printed board 13 into the intervals each corresponding to the size of the mirror 15 are recorded in the storage devices within the infrared detector 16 or personal computer 17.

Figure 6:
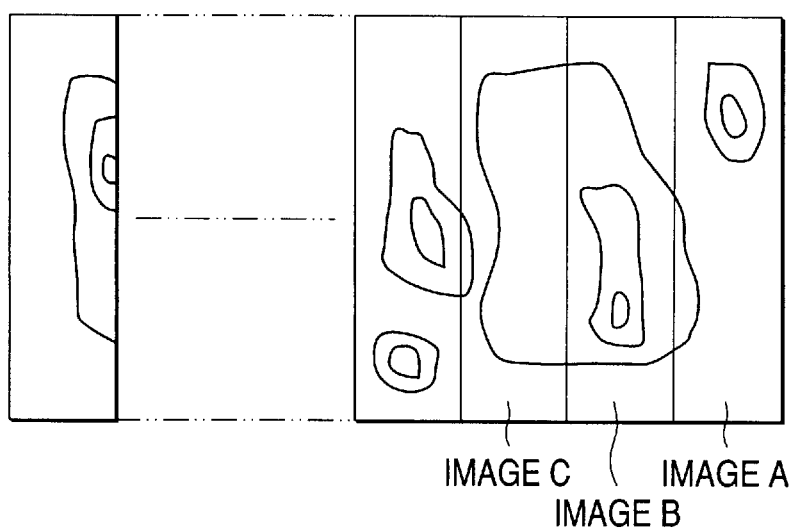
FIG. 6 is a graph showing the measurement result of the temperature distribution according to the first embodiment.

These strip-like infrared images can be combined as shown in FIG. 6 to provide the infrared image (temperature distribution) of the entire card 7.

In this way, using the space corresponding to a sheet of print card, the temperature distribution of the printed board in its state mounted in an actual box, i.e. sub-rack can be measured.

In the above explanation, as shown in FIG. 5, the mirror 15 is intermittently moved like A, B, C, . . . to provide the infrared image as shown in FIG. 6. But, the mirror 15 can be moved continuously so that the infrared images obtained successively are subjected to necessary processing by the personal computer 17, thereby acquiring the temperature distribution.

Further, the mirror can be moved continuously to arrange the image data for each scanning continuously as moving video data, thereby capturing the transient phenomenon of temperature at the time of partial malfunction of the cooling fan.

In this embodiment, the wind rectifying plate for preventing wind leakage (interrupting member) 18 is provided so that the air stream between the inside and outside of the sub-rack 21 is interrupted. But, where the front panel 10 is not present on the print card 7, such a wind rectifying plate can be omitted.

As described above, in accordance with this embodiment, the infrared radiated from the print card which is a measurement object is led to the front face of the sub-rack through the mirror moving in an inserting/removing direction of the printed board. Therefore, by installing the infrared detector in front of the sub-rack, the temperature distribution of the printed board in its actual mounted state can be measured.

Further, since the mirror unit is made insertable in the sub-rack within a space occupied by a sheet of the print card, the temperature distribution of the printed board in its state mounted in an actual box or sub-rack can be measured.

(Embodiment 2)

In the first embodiment, the mirror is caused to have a length equal to the width of the printed board. In this case, the mirror unit must be fabricated for each of the printed boards having different exterior sizes.

Figure 7:
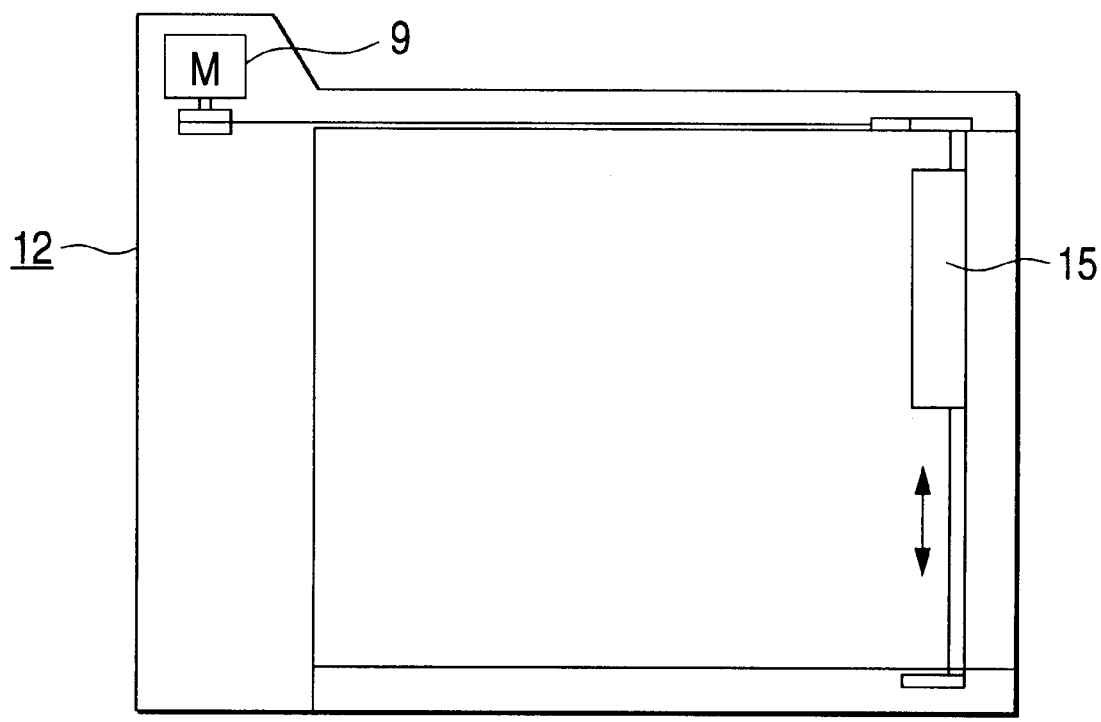
FIG. 7 is a side view showing the main part of the mirror unit according to the second embodiment.

As shown in FIG. 7, the mirror 15 having a length smaller than the width of the printed board is made movable in a direction vertical to the driving direction of the mirror 15 so that the temperature distribution can be measured also in areas of the printed board divided in a vertical direction.

Namely, since the mirror can be made movable freely in a direction in parallel to the printed board, the mirror may not be prepared for each of the printed boards having different sizes. This makes it possible to measure the printed boards having different sizes using a single kind of mirror.

(Embodiment 3)

In the first embodiment, an apparatus is proposed in which the mirror for reflecting infrared is moved and the infrared led to the front face of the sub-rack are captured by the infrared camera. In this apparatus, however, whenever the printed board which is a measurement object is changed, the position of the camera must be moved so that trimming the mirror position and camera position is required for each time.

Figure 8:
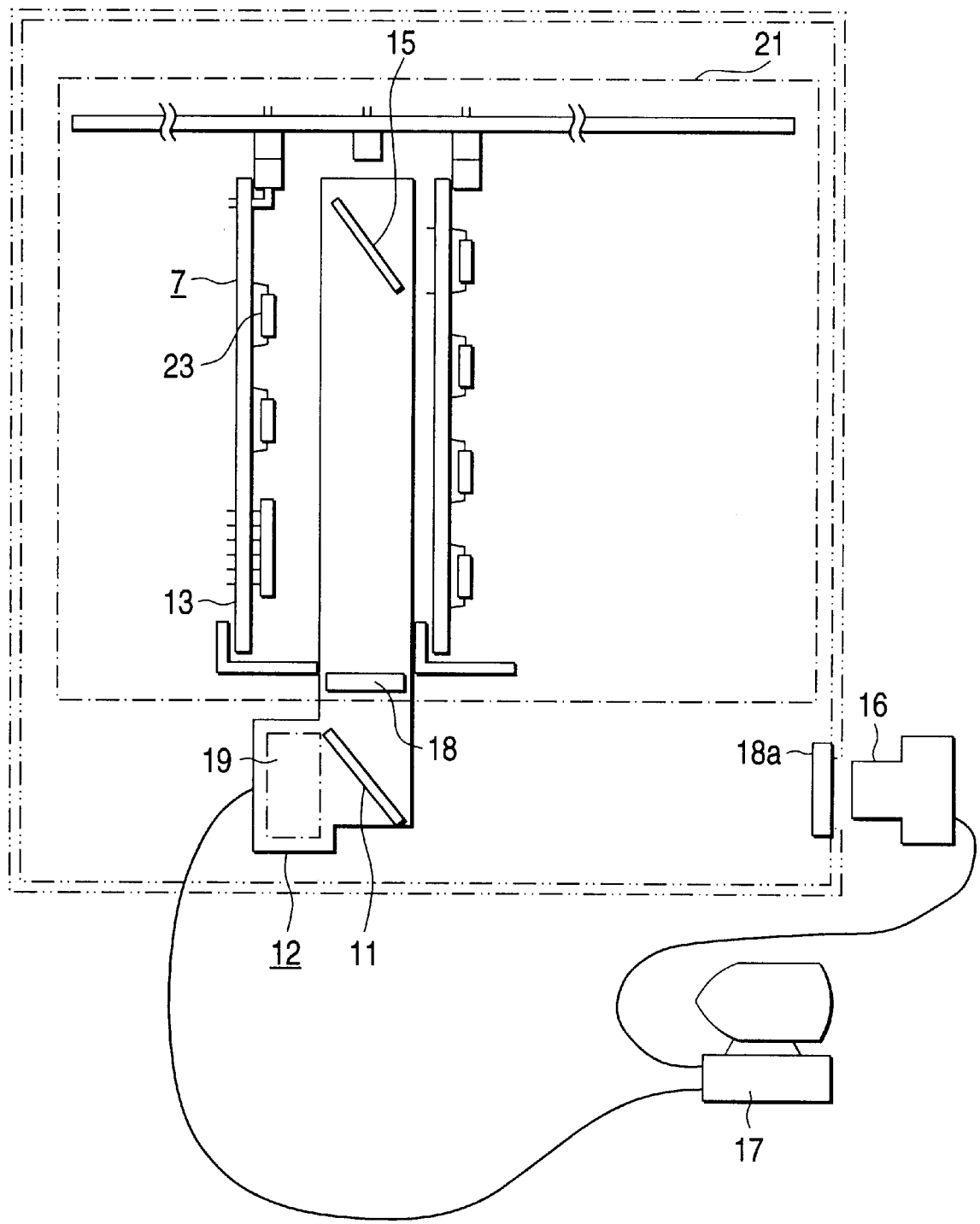
FIG. 8 is a view showing the arrangement of the temperature measuring device for a print card according to the third embodiment.

In the third embodiment, as shown in FIG. 8, a fixed mirror 11 is installed on the mirror unit 12 so that the infrared can be led to the side of the sub-rack 21. Therefore, with the camera position fixed, the temperature of the printed boards having different slots can be measured. Where an obstacle is present in front of the sub-rack in board mounting, the temperature distribution of the entire print card can be measured.

In the third embodiment shown in FIG. 8, the infrared is reflected by the fixed mirror 11 in a direction of the side of the sub-rack 21. This is because a plurality of print cards are arranged horizontally in the sub-rack 21. On the other hand, where the printed cards are arranged vertically by rotation of 90° of the sub-rack, the fixed mirror is arranged to reflect the infrared upward or downward, and hence the infrared detector 16 is arranged above or below the sub-rack 21. In short, the reflecting direction of the infrared by the fixed mirror 11 is coincident to that of arranging the plurality of print cards in the sub-rack.

(Embodiment 4)

In the first embodiment, an apparatus is provided in which the mirror reflecting infrared is driven to lead out the infrared and the infrared thus led out is captured by the infrared camera. In this case, however, processing of holding the infrared camera 16 and making a window of the infrared permeable material 18 in the board, or a space for installing the infrared camera 16 between the front face and board 31 are necessitated.

Figure 9:
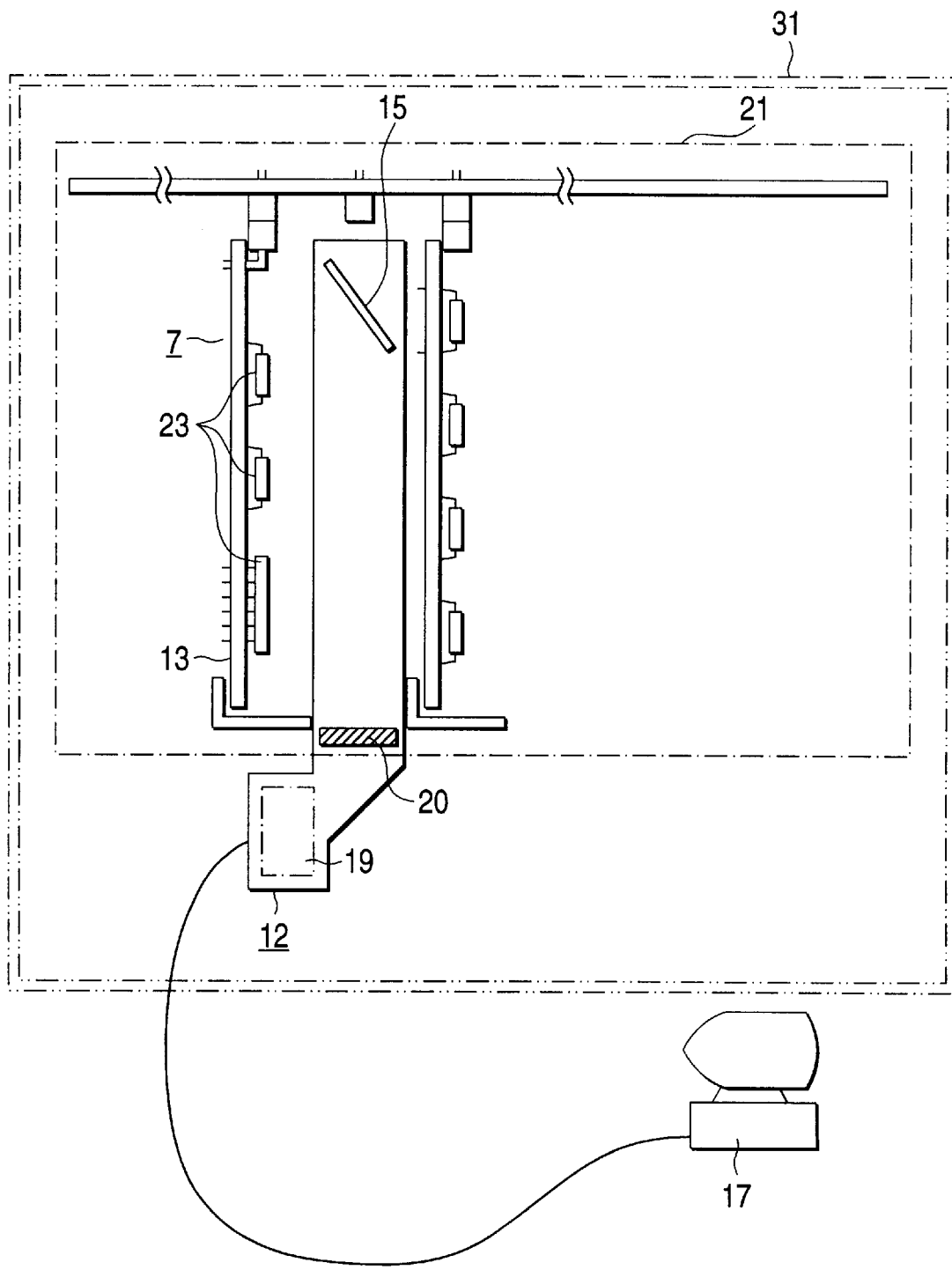
FIG. 9 is a view showing the arrangement of the temperature measuring device for a print card according to the fourth embodiment.

FIG. 9 shows an improvement for removing such a necessity, in which the infrared sensor 20 for detecting the reflected infrared installed in place of the rectifying plate 18 for prevention of wind leakage.

The infrared sensor 20 is a matrix shape (composed of a large number of pixels) of e.g. indium antimonide (InSb) to provide an image signal of infrared.

The infrared sensor is used in a manner cooled by "argon gas cooling" or "Stirling cooling".

Although no lens is shown in FIG. 9, the lens for converging light is attached.

Since provision of the infrared sensor permits the infrared to be converted into an electric signal within the mirror unit 12, no processing of the board nor installing of the detector such as an infrared camera is required, thereby measuring the temperature distribution of the entire print card more easily.

(Embodiment 5)

In the first embodiment, an apparatus is provided in which the mirror reflecting infrared is driven to lead out the infrared and the infrared thus led out is captured by the infrared camera. In this case, the angle of the mirror and location of the camera lens must be adjusted finely.

Figure 10:
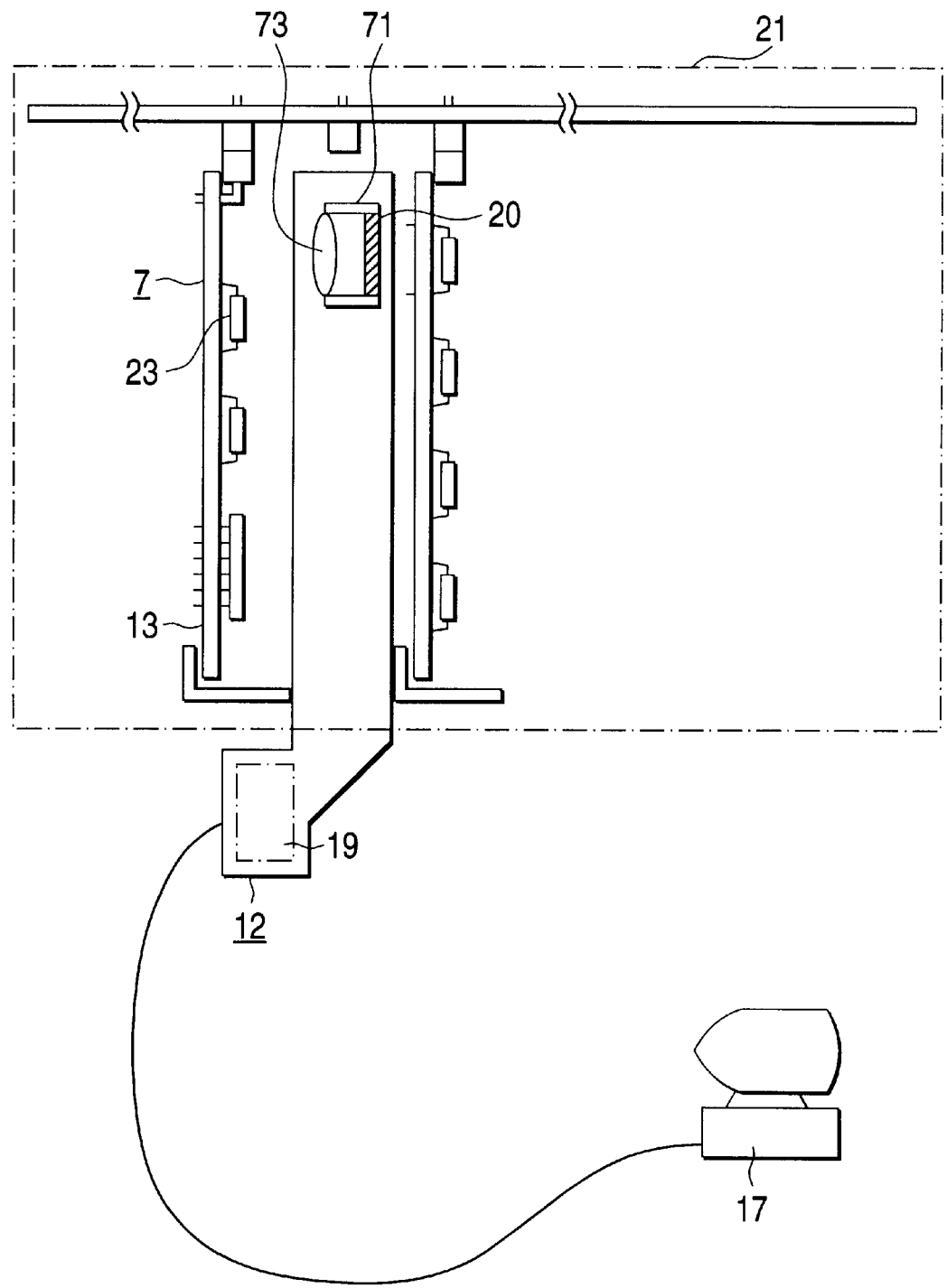
FIG. 10 is a view showing the arrangement of the temperature measuring device for a print card according to the fifth embodiment.

FIG. 10 shows the fifth embodiment of the present invention, in which the infrared sensor 20 opposite to the print card 7 is located in place of the mirror, and the infrared sensor 20 is provided with a hood 71 and a lens for converging the infrared image.

By driving the infrared sensor 20 in parallel to the print card 7 which is a measurement object, the infrared can be converted into an electric signal within the mirror unit 12. This permits the temperature distribution of the entire print card to be measured without using the infrared reflecting mirror and detector such as the infrared camera.

(Embodiment 6)

Figure 11:
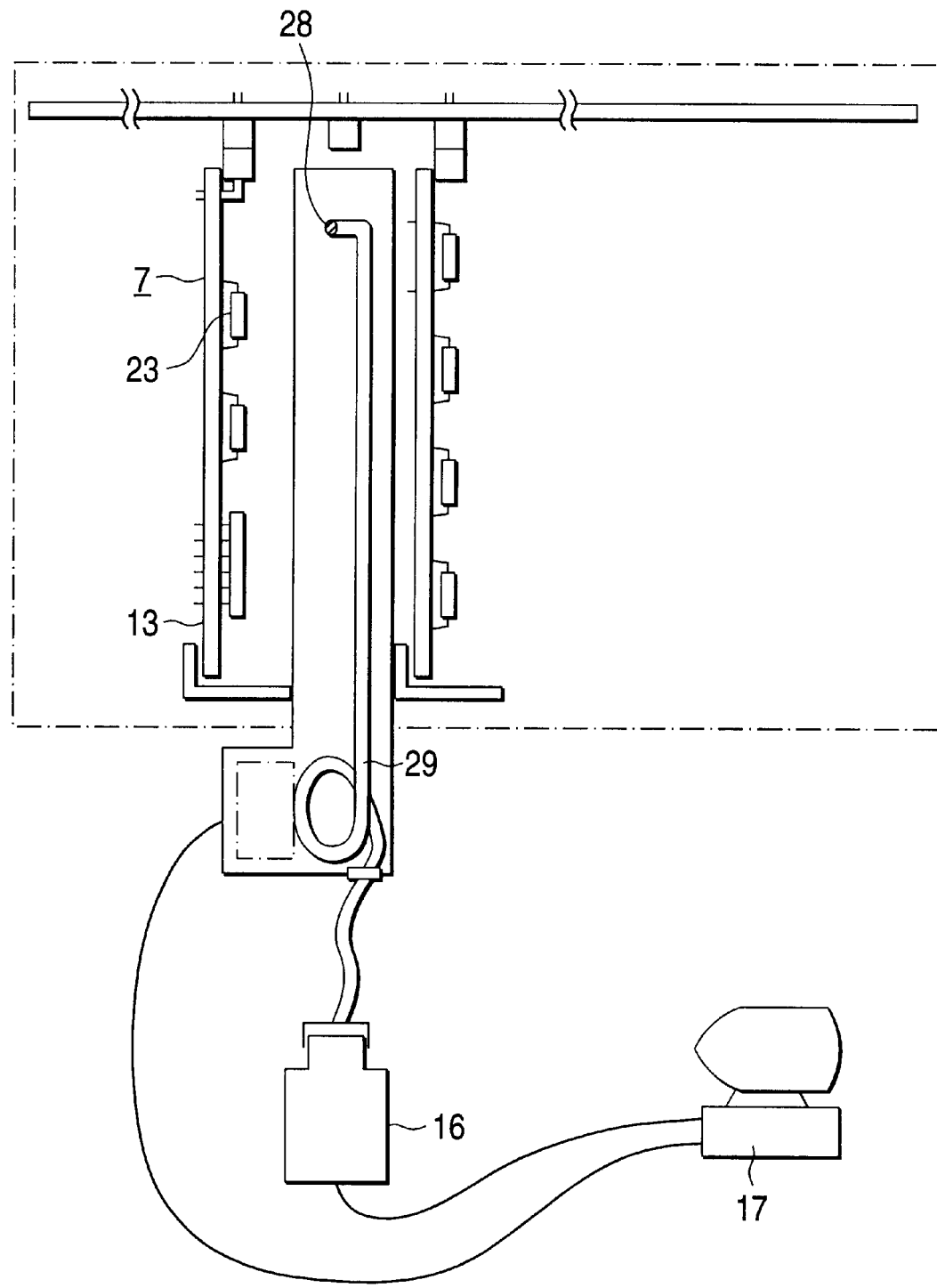
FIG. 11 is a view showing the arrangement of the temperature measuring device for a print card according to the sixth embodiment.

In the embodiments, an apparatus is provided in which the mirror reflecting infrared is driven to lead out the infrared to the front of the sub-rack and the infrared thus led out is captured by the infrared camera. But, as shown in FIG. 11, in accordance with this embodiment, an apparatus may be adopted in which an optical fiber 29 with a small refraction index for transferring the infrared is used in place of the mirror, a lens 28 is attached to the tip of the optical fiber 29, and the infrared from the optical fiber 29 are captured by the detector (infrared camera) 16.

In such a configuration, the optical fiber 29 is moved in parallel to the print card which is a measurement object, the infrared detected by the optical fiber 29 is converted into an image signal, and the temperature distribution is acquired from the image signal by the personal computer 17.

(Embodiment 7)

The first embodiment adopts a structure providing no ventilation within the mirror unit. Therefore, mounting of the mirror unit may change the ventilation resistance of the sub-rack so that the velocity of the cooling air flowing on the print card or measurement object is different from an actually designated velocity thereof, thereby exerting an influence on the temperature measurement result.

Figure 12A:
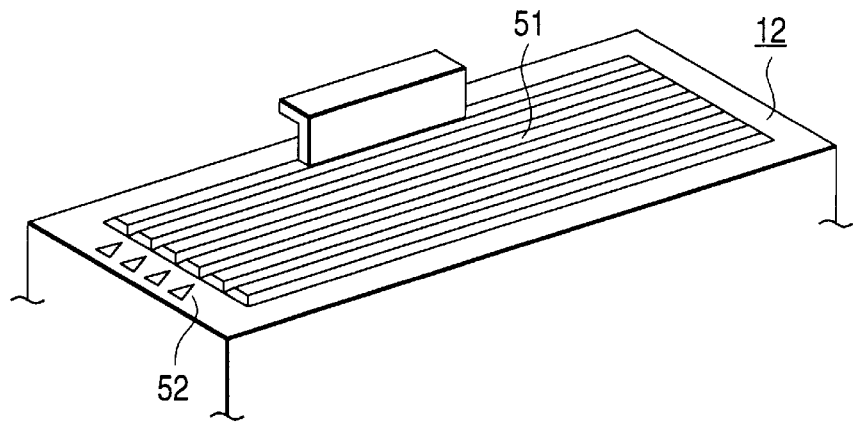
FIGS. 12A and 12B are view showing an adjusting mechanism for a cooling ventilation inlet of the mirror unit according to the seventh embodiment.
Figure 12B:
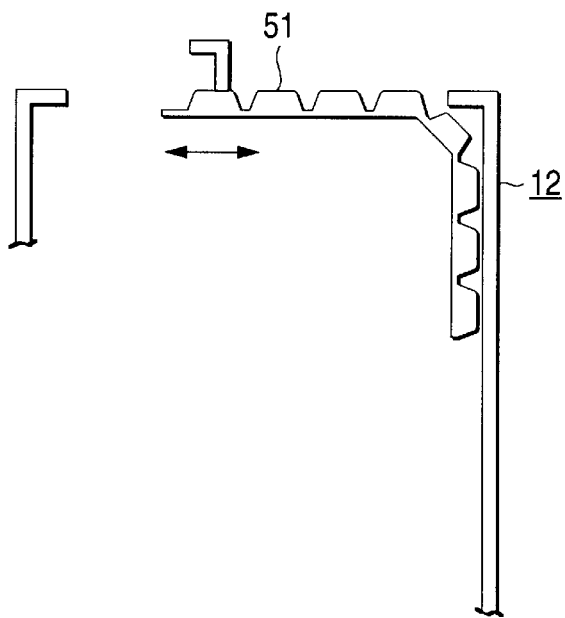
Figure 13:
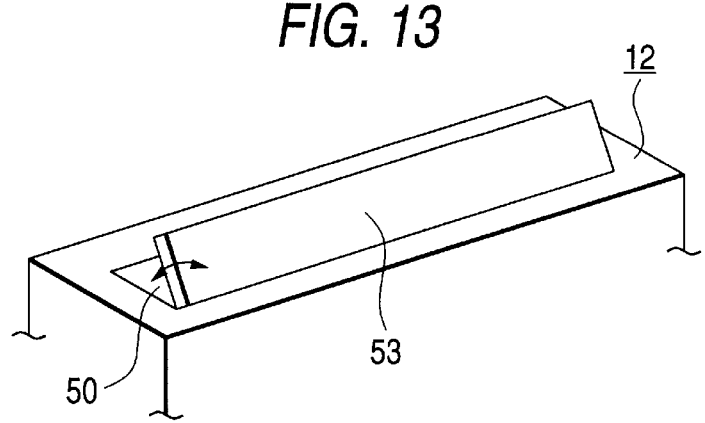
FIG. 13 is a view showing an adjusting mechanism for a cooling ventilation inlet of the mirror unit according to the seventh embodiment.

FIGS. 12A and 12B show a configuration to improve such a disadvantage, in which a mechanism capable of adjusting an opening area is provided on at least one of the upper and lower surfaces of the mirror unit 12.

Namely, as shown in FIG. 12, a mechanism 51 for adjusting an opening rate which can open or close freely like a shutter is provided at the cooling ventilation inlet 50 to adjust the opening rate looking at the indicated scale of the opening rate.

Using such a mechanism, the opening area is adjusted while the air velocity on the printed card which is a measurement card is monitored and a pressure loss equivalent to the print card mounted at the mounting position of the mirror unit is formed. Thus, the velocity of the air for cooling the print card which is a measurement object can be adjusted to the designated condition, thereby realizing the temperature measurement with high accuracy.

In the structure shown in FIG. 12, an opening for cooling ventilation which can adjust the opening area is provided at the upper portion of the cover of the mirror unit 12. Such an opening, however, may be provided at the lower portion as well as the upper portion.

Inversely, another structure may be adopted in which the lower portion has an opening capable of adjusting the opening area, whereas the upper portion has an opening with a fixed area.

FIG. 8 shows a further structure of a mechanism for adjusting the opening area, in which a movable plate 53 covers the cooling ventilation inlet 50 at an optional angle to adjust the ventilation resistance. In this case, the opening rate with the mirror unit 12 being attached to the sub-rack can be more easily adjusted than in the structure of FIG. 12.

(Embodiment 8)

It is assumed in the first embodiment that the mirror unit does not generate heat. But where the print card mounted at the mounting position of the mirror unit generate a large quantity of heat, its influence on the temperature rise of the air between the slots into which the print cards are inserted cannot be disregarded.

Figure 14:
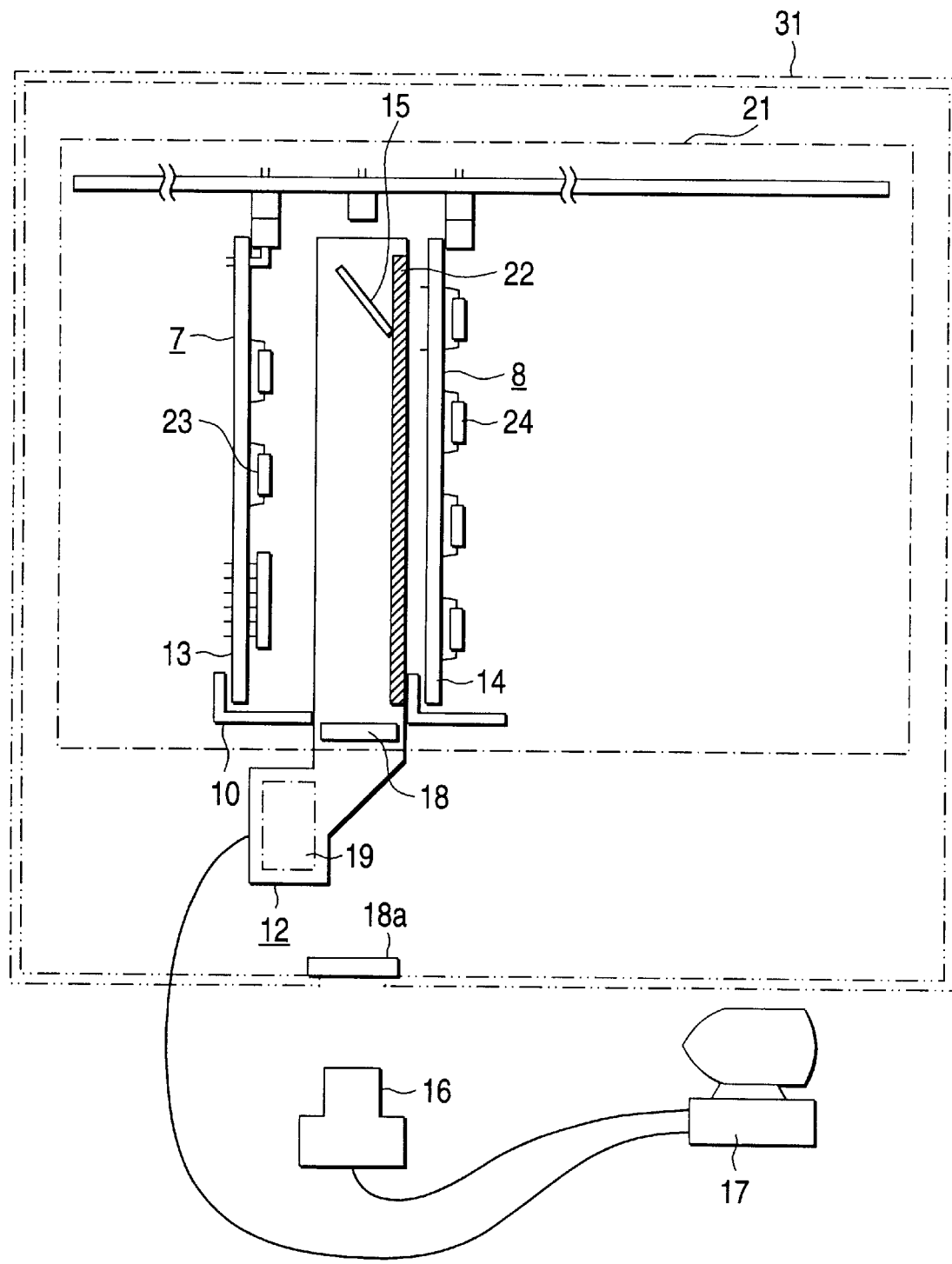
FIG. 14 is a view showing the configuration of the temperature measuring device for a print card according to the eighth embodiment.

FIG. 14 shows a configuration for improving such a difficulty, in which a heat generator of a panel heater 22 is installed within the mirror unit 12 (at the position adjacent to the mirror unit 12 where the width of the mirror unit 12 is thin).

In such a configuration, since the heat equivalent to the print card mounted at the mounting position of the mirror unit 12 can be generated, the temperature distribution can be realized accurately even when the heat generation in the adjacent card exerts a great influence on the temperature of the print card.

(Embodiment 9)

Although the first embodiment has been applied to temperature measurement, the mirror unit can be applied to acquire the distribution of the air velocity of the air flowing within the sub-rack.

Figure 15:
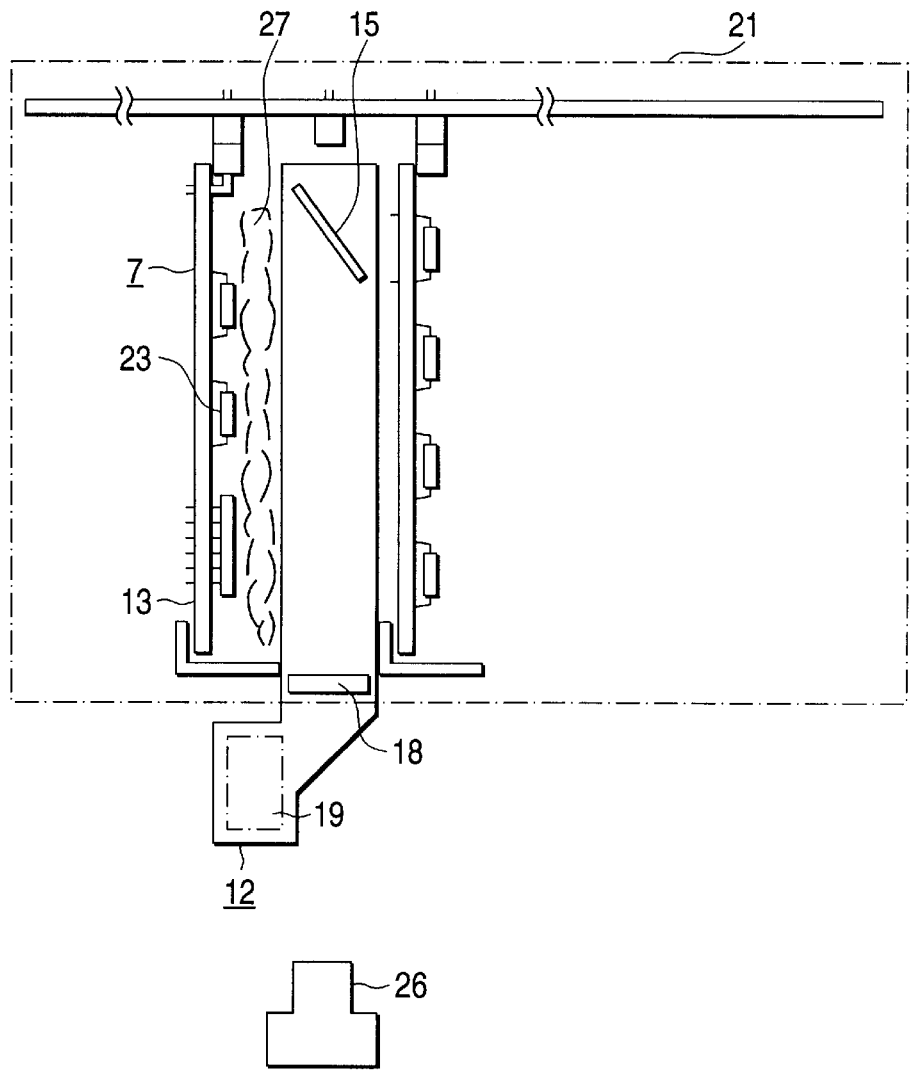
FIG. 15 is a view showing the configuration of an air velocity device according to the ninth embodiment of the present invention.
Figure 16:
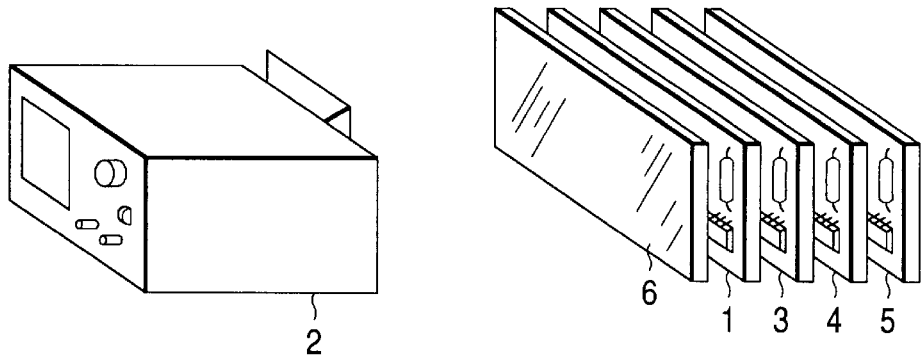
FIG. 16 is a view showing the temperature measuring method of a conventional print card.

FIG. 15 is a view showing an arrangement for realizing it. In FIG. 15, reference numeral 27 denotes a target such as smoke for visualizing the air stream and reference numeral 26 denotes a device for observing or measuring the velocity distribution of the air stream such as a video camera or laser current meter.

As seen from FIG. 15, with a material for visualizing the air stream such as smoke within the sub-rack 21, i.e. a target such as smoke or dry ice being passed, the mirror 15 is moved to a position where the temperature is desired to be measured. In this case, in place of the infrared sensor, the laser video camera and its reproducing device or the laser air velocity meter is used to visualize the stream of the cooled air or measure the distribution of the air velocity.

The laser velocity meter (current meter) is commercially available, and is based on the principle of the Doppler effect. The velocity distribution is indicated in terms of vector. The direction of air velocity is represented by a large number of arrows on a screen and the length of each arrow represents the air velocity at the position.

In this embodiment, although the air velocity is measured using the mirror unit according to the first embodiment, a wind rectifying plate according to the seventh embodiment and the panel heater according to the eighth embodiment may be added.

As described above, with the material for visualizing the air stream such as smoke being passed within the sub-rack, the laser air velocity meter or video camera is used so that the air velocity can be measured and the air stream can be visualized.

(1) In accordance with the present invention, since the infrared from the print card is reflected by the moving mirror to measure the temperature distribution, the temperature distribution of the print card can be accurately measured in its state mounted in a card rack.

(2) Since the infrared reflected by the mirror are detected by the infrared detecting means through a member which can permeate the infrared but interrupt the air stream between the inside and outside of the card rack, the temperature distribution can be accurately measured with no disturbance of the air stream within the card rack.

(3) Since the second mirror for reflecting in a direction in which a plurality of print cards are arranged from the front of the card rack, the temperature distribution in any print card can be measured without moving the infrared detecting means.

(4) Since the infrared reflected from the mirror is directly detected by the infrared sensor, the detecting means such as the infrared camera is not required and the area for installing it is not also required, the entire arrangement is simplified and processing for the board for leading out the infrared is not required.

(5) Since the detection unit is composed of the infrared sensor movable in parallel to the print card in place of the mirror so that the infrared from the print card is directly detected, the mirror or infrared camera is not required to simplify the entire arrangement.

(6) Since the infrared from the print card is directly detected by the optical fiber movable in parallel to the print card, the entire arrangement can be simplified.

(7) Since on at least one of the upper and lower surfaces of the cover of the mirror unit or detecting unit, an opening for cooling/ventilation whose area is adjustable is provided, the air stream equivalent to that when the print card is mounted at the position of the above unit can be created to measure the temperature distribution accurately.

(8) Since a panel heater is provided within the mirror unit or detecting unit or in the neighborhood of these units, the heat equivalent to the print card mounted at the mounting position of the mirror unit can be generated. Thus, the temperature distribution can be measured accurately even when the heat generation in the adjacent card exerts a great influence on the temperature of the print card which is a measurement object.

(9) Since the mirror unit or detecting unit has a size not larger than that occupied by a single print card and insertable in the card rack, the temperature distribution of the print card can be measured in its mounted state.

(10) Since the air stream flowing within the card rack is visualized to measure the velocity of the air stream, the state of the air stream exerting an affect on the temperature of the print card can be caught to take a necessary countermeasure.

What is claimed is:

1. A temperature measuring apparatus for a print card comprising:

a mirror unit including a first mirror disposed proximate a print card in a card rack for reflecting infrared radiation radiated from the print card in a direction of inserting the print card into the card rack, a driver for moving the first mirror in the card rack parallel to the print card, and a second mirror for reflecting the infrared radiation reflected from the first mirror in a direction in which a plurality of print cards are arranged from a front of the card rack;

infrared radiation detecting means disposed outside the card rack for detecting infrared radiation reflected from the second mirror; and measuring means responsive to the detecting means for measuring a temperature distribution of the print card on the basis of the detected infrared radiation.

2. The temperature measuring apparatus of claim 1 wherein:

the mirror unit further comprises an interrupting member permeable to the reflected infrared radiation and interrupting an air stream flowing between inside and outside the card rack; and the infrared detecting means detects the infrared radiation from the print card reflected from the first mirror and permeated through the interrupting member.

3. The temperature measuring apparatus of claim 1 wherein the infrared detecting means comprises an infrared sensor.

4. The temperature measuring apparatus of claim 1 wherein the mirror unit has upper and lower covers on upper and lower surfaces thereof, respectively, and at least one of the upper and lower covers includes an opening for cooling/ventilation with an adjustable area.

5. The temperature measuring apparatus of claim 1 wherein the mirror unit has a size not larger than a single print card and is insertable in the card rack.

6. A temperature measuring apparatus for a print card comprising:

a detecting unit including an optical fiber for detecting infrared radiation radiated from a print card inserted in a card rack, and a driver for moving the optical fiber in the card rack parallel to the print card, the detecting unit being disposed proximate the print card;

a panel heater located within the detecting unit or in the neighborhood of the detecting unit and parallel to the print card;

infrared detecting means for detecting infrared radiation from the print card by moving the optical fiber using the driver; and measuring means responsive to the infrared detecting means for measuring a temperature distribution of the print card in response to detected infrared radiation.

7. The temperature measuring apparatus of claim 6 wherein the detecting unit has an upper and lower cover on an upper and lower surface thereof, respectively, and at least one of the upper and lower cover is provided with an opening for cooling/ventilation with an adjustable area.

8. The temperature measuring apparatus of claim 6 wherein the detecting unit has a size not larger than that occupied by a single print card and is insertable in the card rack.

9. A temperature measuring apparatus for a print card comprising:
- a mirror unit including a first mirror disposed proximate a print card in a card rack for reflecting infrared radiation radiated from the print card in a direction of inserting the print card into the card rack, and a driver for moving the first mirror in the card rack parallel to the print card;
- a panel heater located within the mirror unit or in the neighborhood of the mirror unit and parallel to the print card;
- infrared radiation detecting means for detecting infrared radiation from the print card reflected by the first mirror; and
- measuring means responsive to the detecting means for measuring a temperature distribution of the print card in response to detected infrared radiation.

10. A temperature measuring apparatus for measuring a temperature of a print card in a card rack for housing a plurality of print cards comprising:
- a mirror unit insertable into a card rack between and immediately adjoining first and second print cards in a space for receiving a third print card, opposite the first print card, and including a first mirror and a driver moving the mirror in a lengthwise direction of the mirror unit, parallel to the first print card;
- an infrared detector optically coupled to the first mirror for receiving light emitted by the first print card and reflected from the first mirror; and
- a measuring device responsive to the infrared detector determining a temperature distribution of the first print card.

11. A temperature measuring apparatus for measuring a temperature of a print card installed in a card rack for housing a plurality of print cards comprising:
- a unit insertable into a card rack between and immediately adjoining first and second print cards in a space for receiving a third print card, opposite the first print card, and including an infrared sensor and a driver moving the infrared sensor parallel to the first print card in a direction of insertion of the first print card into the card rack; and
- a measuring device responsive to the infrared detector determining a temperature distribution of the first print card.

12. A temperature measuring apparatus for measuring a temperature of a print card installed in a card rack comprising:
- an infrared detector disposed on an optical path of infrared radiation emitted from a print card in a card rack;
- a measuring device responsive to the infrared detector determining a temperature distribution of the print card; and
- a panel heater removably disposed in the card rack, opposite the print card, for heating the print card during temperature measurement.

13. A temperature measuring apparatus for measuring a temperature of a print card installed in a card rack for housing a plurality of print cards comprising:
- a unit insertable into a card rack between and immediately adjoining first and second print cards in a space for receiving a third print card, opposite the first print card, and including an optical fiber receiving infrared radiation from the first print card and a driver moving the optical fiber parallel to the first print card in a direction of insertion of the first print card into the card rack;
- an infrared detector receiving infrared radiation transmitted by the optical fiber; and
- a measuring device responsive to the infrared detector determining a temperature distribution of the first print card.

* * * * *